United States Patent [19]
Marmonier et al.

[11] Patent Number: 5,889,467
[45] Date of Patent: Mar. 30, 1999

[54] METHOD OF MONITORING A LEAKAGE RATE FROM THE ENVELOPE OF HIGH VOLTAGE ELECTRICAL APPARATUS

[75] Inventors: Jean Marmonier; Jean-Francois Penning, both of Aix les Bains, France

[73] Assignee: GEC Alsthom T & D SA, Paris, France

[21] Appl. No.: 69,075

[22] Filed: Apr. 29, 1998

[30] Foreign Application Priority Data

Apr. 30, 1997 [FR] France .................................. 97 05360

[51] Int. Cl.⁶ .................................................. G08B 21/00
[52] U.S. Cl. ........................ 340/605; 340/626; 340/632; 340/870.02; 340/870.05; 73/40.5 R
[58] Field of Search .................................... 340/605, 634, 340/632, 626, 638, 870.02, 870.03, 870.04, 870.05; 73/438, 40.5 R

[56] References Cited

U.S. PATENT DOCUMENTS

| | | | |
|---|---|---|---|
| 4,041,771 | 8/1977 | Allan et al. | 340/605 |
| 4,043,180 | 8/1977 | Morris et al. | 340/605 |
| 4,417,603 | 11/1983 | Argy | 138/149 |
| 4,450,711 | 5/1984 | Claude | 73/40.5 R |
| 4,796,676 | 1/1989 | Hendershot et al. | 340/605 |
| 5,502,435 | 3/1996 | Ralston | 340/632 |
| 5,719,564 | 2/1998 | Sears | 340/870.04 |

FOREIGN PATENT DOCUMENTS

| | | |
|---|---|---|
| 0637114A1 | 2/1995 | European Pat. Off. . |
| 0726630A1 | 8/1996 | European Pat. Off. . |
| 8273939 | 10/1996 | Japan . |

*Primary Examiner*—Jeffery A. Hofsass
*Assistant Examiner*—Davetta C. Woods
*Attorney, Agent, or Firm*—Sughrue, Mion, Zinn, Macpeak & Seas, PLLC

[57] ABSTRACT

The method consists in: i) making a series of recordings of the density of the gas at regular time intervals during a nighttime period by means of a temperature-compensated pressure sensor fixed on the outside of the envelope and communicating with the gas via a duct formed through the thickness of the envelope; ii) processing the density recordings of the gas acquired during the nighttime period in hourly intervals, each hourly interval giving rise to an hourly mean value for the density of the gas; iii) processing the hourly mean values obtained at the end of each hourly interval to give a daily mean value for the density of the gas at the end of the nighttime period; and iv) determining the leakage rate from the envelope by taking the difference between mean densities obtained at the ends of two different nighttime periods.

4 Claims, 5 Drawing Sheets

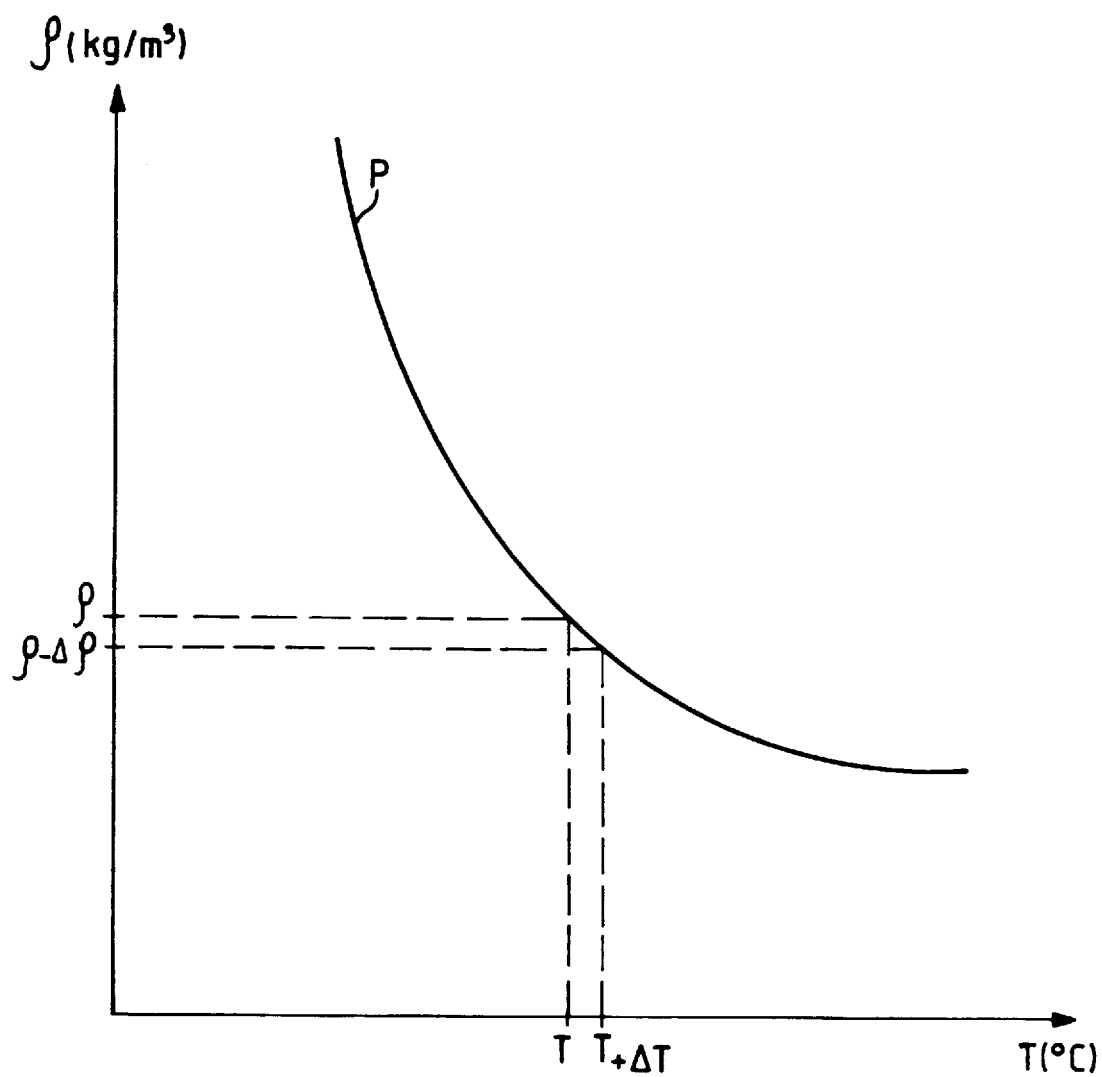

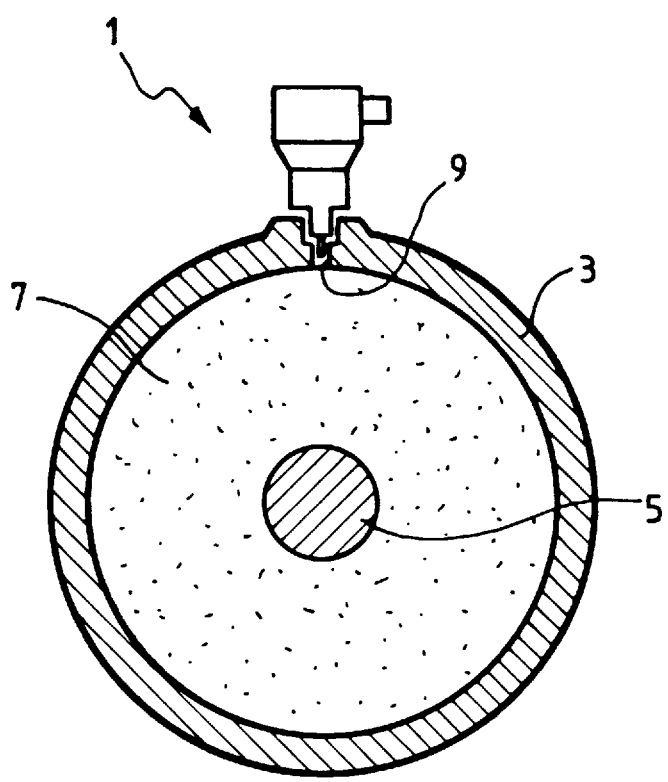

FIG_3
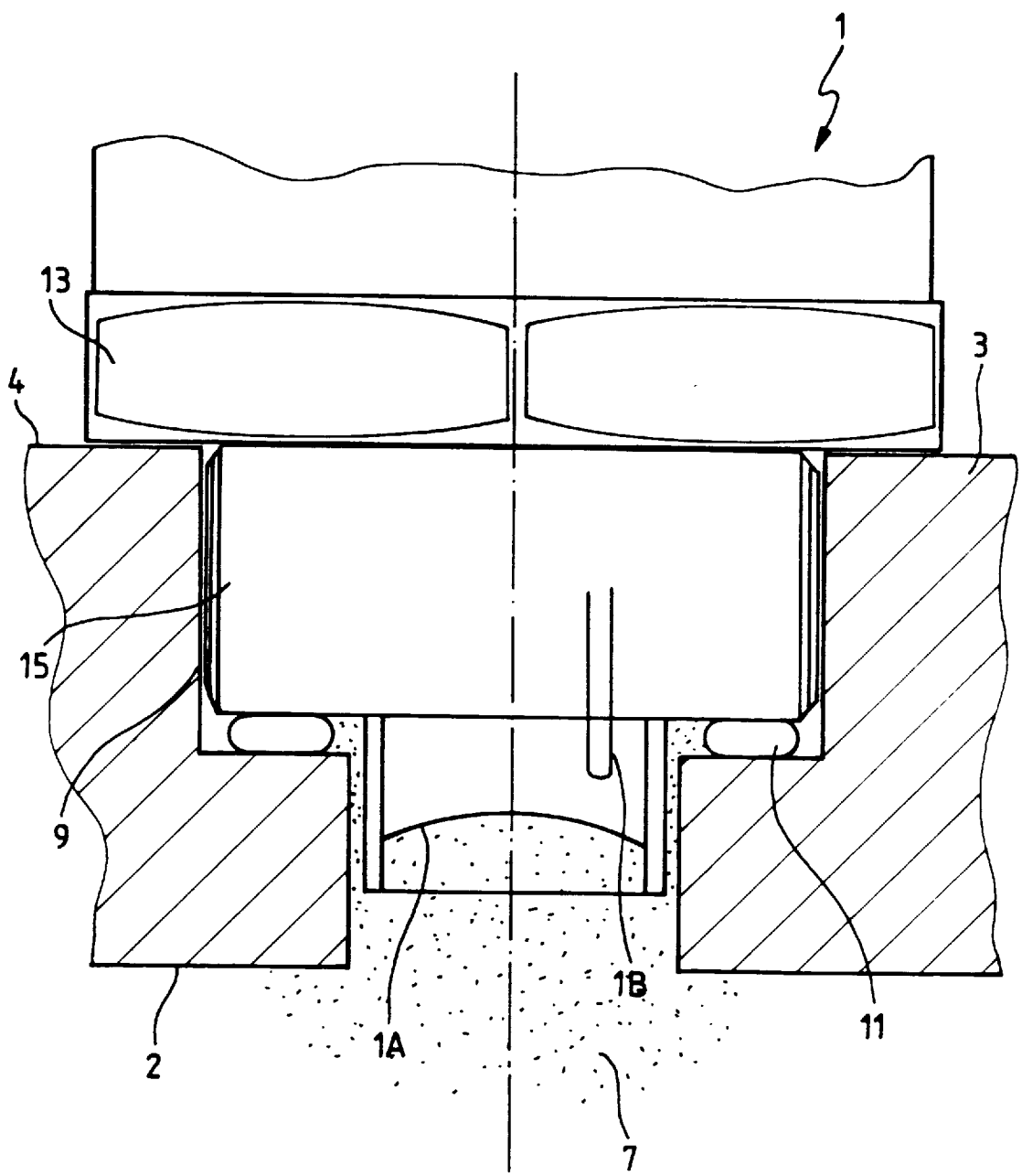

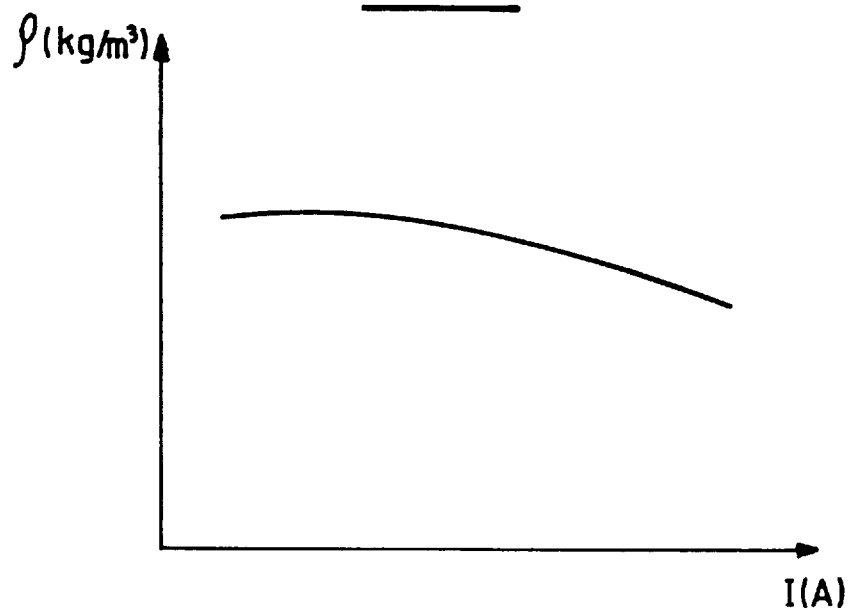
FIG_4
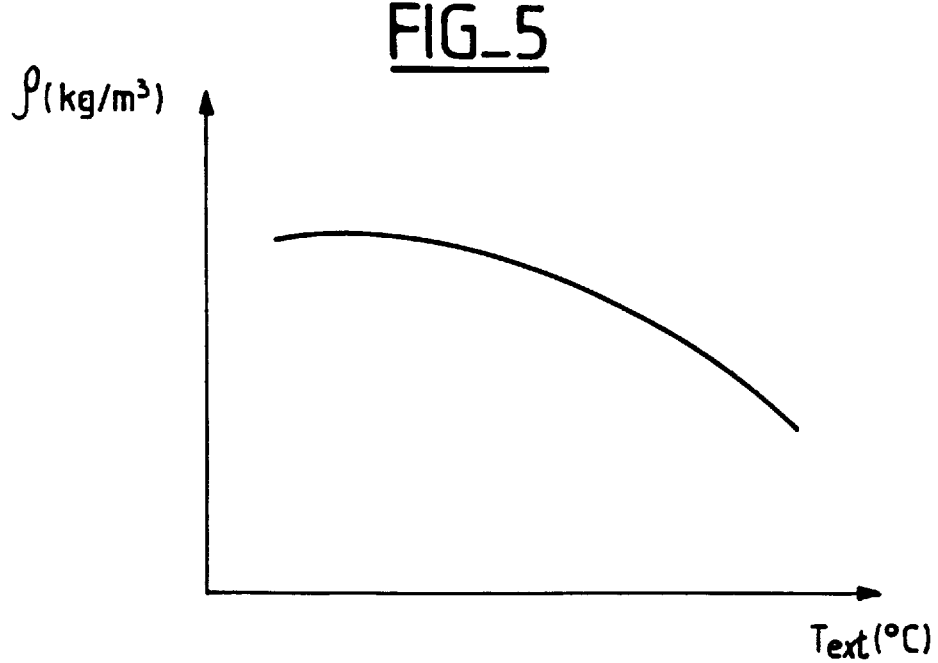
FIG_5

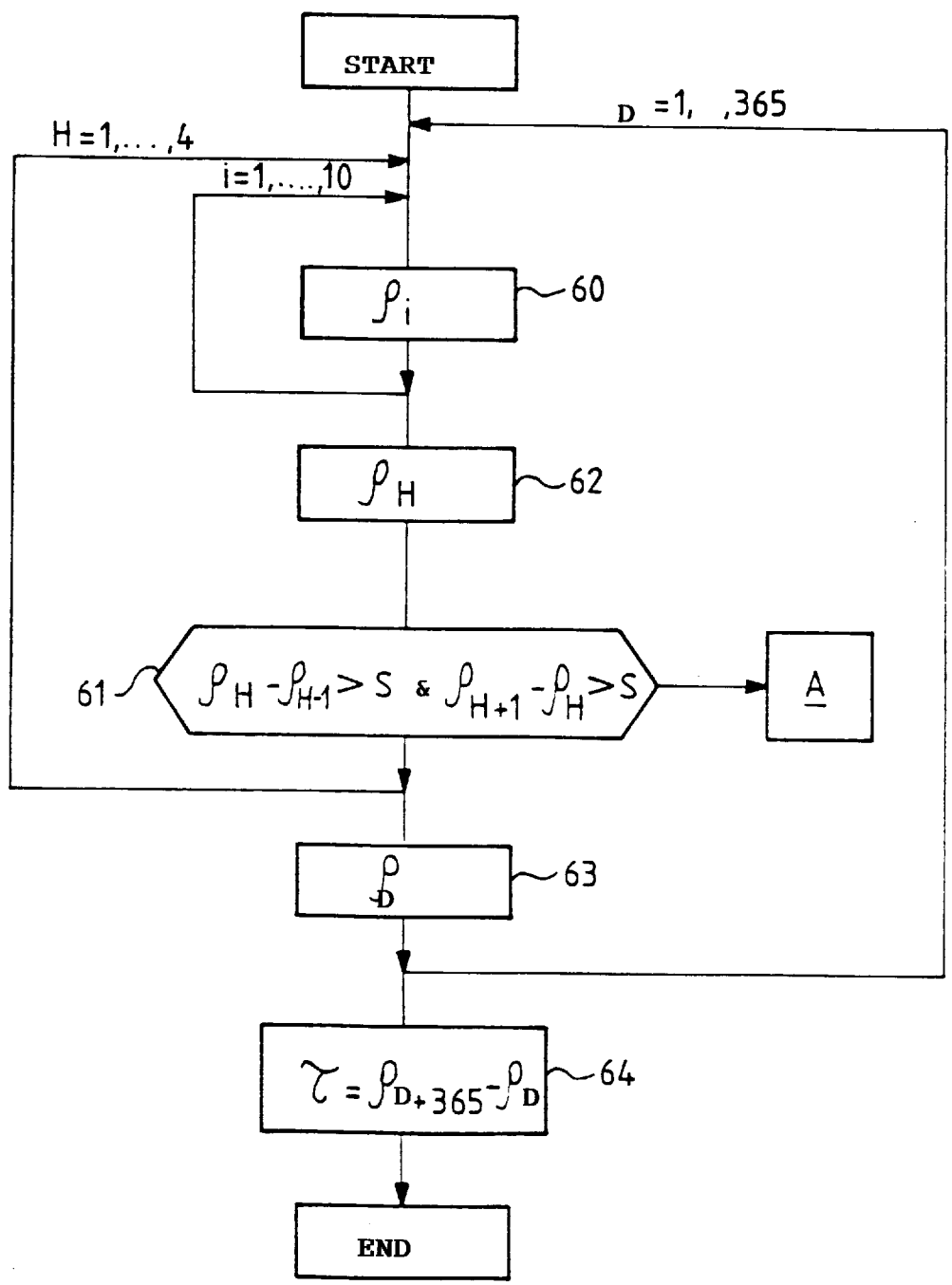

METHOD OF MONITORING A LEAKAGE RATE FROM THE ENVELOPE OF HIGH VOLTAGE ELECTRICAL APPARATUS

FIELD OF THE INVENTION

The invention relates to a method of monitoring a leakage rate from the envelope of high voltage electrical apparatus containing a gas under pressure.

The invention applies more particularly to monitoring a leakage rate of a dielectric gas, such as sulfur hexafluoride $SF_6$, contained in an envelope providing electrical shielding for high voltage apparatus, e.g. a circuit breaker, and at a pressure lying in the range a few bars to 10 bars.

BACKGROUND OF THE INVENTION

In known manner, the leakage rate is calculated from the density of the gas contained inside the envelope, where density is itself determined by a temperature-compensated pressure sensor. It should be observed that compensation can also be performed by a temperature sensor that is distinct from the pressure sensor. Nevertheless, a single sensor simplifies assembly.

The temperature compensated pressure sensor must be fixed to the outside wall of the envelope in order to avoid the risk of an electric arc being stuck between the envelope and the circuit breaker under the effect of the high voltage, and it must have a pressure detector and a temperature detector that are in communication with the gas via a duct passing through the thickness of the envelope.

The temperature as measured must be as close as possible to the temperature of the gas. FIG. 1 shows how the density $\rho$ of the gas varies as a function of temperature T for a given pressure P. At a temperature T, the gas has density $\rho$. If the sensor picks up a temperature $T+\Delta T$ that differs from T by uncertainty $\Delta T$ (which is positive in the example of FIG. 1), then the compensation performed on the pressure P will lead to a density $\rho-\Delta\rho$ that is erroneous having uncertainty $\Delta\rho$ (which is negative in the example of FIG. 1).

To detect and track over time the evolution of any leak of gas from the envelope of the circuit breaker, the measurement uncertainty associated with the density sensor must be negligible compared with any reduction of density due to a leak.

An annual leakage rate of the order of 1% is assumed during testing performed on site. Although the sensor used has density measurement stability of the order of 0.2% over a year, differences of several percent have been observed between daily averages of density.

Tests have shown that sunshine and heating of the electrical apparatus constitute two major sources of uncertainty in determining density. As a function of the amount of sunshine and of the electrical current flowing through the apparatus, the envelope is subjected to daily variations of temperature. These variations give rise to temperature differences between the gas and the detector, since they response differently to the thermal influence of the envelope at the communication duct formed through its thickness.

OBJECTS AND SUMMARY OF THE INVENTION

The object of the invention is thus to propose a method of monitoring the leakage rate from the envelope of a high voltage electrical apparatus by means of a temperature compensated pressure sensor that is intrinsically stable, which method is simple to implement, given the constraints imposed by the envelope, as described above.

To this end, the invention provides a method of monitoring the leakage rate from the envelope of a high voltage electrical apparatus containing a gas under pressure, the method consisting in:

i) making a series of recordings of the density of the gas at regular time intervals during a nighttime period by means of a temperature-compensated pressure sensor fixed on the outside of the envelope and communicating with the gas via a duct formed through the thickness of the envelope;

ii) processing the gas density recordings acquired during the nighttime period in hourly intervals, each hourly interval giving rise to an hourly mean value for the density of the gas;

iii) processing the hourly mean values obtained at the end of each hourly interval to give a daily mean value for the density of the gas at the end of the nighttime period; and iv) determining the leakage rate from the envelope by taking the difference between mean densities obtained at the ends of two different nighttime periods.

Nighttime recordings of pressure and temperature make it possible to a large extent to eliminate sources of uncertainty concerning density determination.

In a particular embodiment of the invention, the nighttime period extends from midnight to 4:00 AM. During this period, the envelope is subjected to little temperature variation, since the outside temperature of the envelope and of the site where the circuit breaker is installed are stable, particularly because there is no sunlight, and since the little current flowing through the circuit breaker is also stable.

BRIEF DESCRIPTION OF THE DRAWINGS

Other characteristics and advantages of the invention will appear on reading the description of an embodiment shown in FIGS. 1 to 6.

FIG. 1 is a curve showing how the density of the gas contained in the envelope varies as a function of temperature at a given pressure.

FIG. 2 shows the envelope of the high voltage electrical apparatus in cross-section.

FIG. 3 shows the density sensor fixed on the outside wall of the envelope, in greater detail.

FIG. 4 shows how the density of the gas contained in the envelope and as seen by the sensor varies as a function of the electrical current passing through the high voltage electrical apparatus.

FIG. 5 shows how the density of the gas contained in the envelope and as seen by the sensor varies as a function of the outside temperature at the site of the installation.

FIG. 6 is a flow chart showing a method of acquiring and processing the pressure and temperature records in order to monitor the leakage rate from a circuit breaker.

MORE DETAILED DESCRIPTION

The invention relates to a method of monitoring a leakage rate from the envelope of a high voltage electrical apparatus.

In FIG. 2, a tubular metal envelope 3 is shown in cross-section with a circuit breaker being represented by shaded area 5. The envelope is closed and contains a dielectric gas 7, e.g. sulfur hexafluoride $SF_6$, or nitrogen $N_2$. By way of example, the density of the gas may lie in the range 23 grams per liter (g/l) to 50 g/l, corresponding to pressure lying in the range 4.5 bars to 8 bars.

The invention makes use of a sensor comprising a pressure detector and a temperature detector. In FIG. 3, a sensor 1 is fixed on the outside wall 4 of the envelope. Sealing is provided by a gasket 11. A duct 9 is machined with a thread in the thickness of the envelope 3 and receives a fixing ring 15 for fixing the sensor. A lock nut 13 ensures that the sensor 1 is securely fixed to the outside wall 4 of the envelope.

The sensor comprises a pressure detector 1A constituted, for example, by a resilient membrane, and a temperature detector 19 constituted, for example, by a platinum element. Both detectors are put into communication with the gas 7 via the duct 9. They do not project from the inside wall of the envelope 2, which is smoothly polished.

The sensor determines the density of the gas from the temperature compensated pressure. The gas 7 contained in the duct 9 and the temperature detector 1B are influenced by local temperature variations of the envelope 3. In daytime, the temperature of the envelope varies as a function of sunshine and as a function of the current passing through the circuit breaker.

FIG. 4 shows the variation in the density $\rho$ as seen by the sensor and plotted as a function of the current I passing through the circuit breaker for constant outside temperature $T_{ext}$ at the site where the circuit breaker is installed. This variation is seen by the sensor even though the real density remains constant. Similarly, FIG. 5 shows the variation in the density $\rho$ as seen by the sensor and plotted as a function of the outside temperature $T_{ext}$ for constant current I flowing through the circuit breaker, with this variation being seen by the sensor even though the real density is constant.

These two figures illustrate experimental results which show that the density $\rho$ seen by the sensor is substantially constant providing the current I and the outside temperature $T_{ext}$ are low.

The method of the invention takes advantage of those experiments by taking pressure and temperature records during a nighttime period, preferably between midnight and 4:00 AM. This is the period during which both the current I and the outside temperature $T_{ext}$ are small, since the demand on the electricity line is low and substantially constant and since there is no sunshine.

A detector for detecting an annual leakage rate $\tau$ of about 1% requires its sensor to have instantaneous measurement accuracy that is much greater than that of most sensors available on the market. That is why the pressure P and the temperature T are not acquired in real time, but at regular time intervals. In the example of FIG. 6, in box 60, a value $\rho_i$ for the density of the gas is recorded every six minutes for a nighttime period extending from midnight to 4:00 AM.

The recordings acquired during the nighttime period are processed by hourly intervals, each hourly interval giving rise to a mean value $\rho_H$ for the density of the gas. In FIG. 6, the nighttime period is subdivided into four hours, with each giving rise in box 62 to an hourly mean value $\rho_H$ calculated from the ten successive recordings acquired during each of the hours and then stored in a memory.

The mean values for the hourly intervals are then processed to give a mean value $\rho_D$ for the density of the gas at the end of the nighttime period. In the example of FIG. 6, the daily mean value $\rho_D$ is calculated in box 63 from the four hourly mean values $\rho_H$ and is then stored in a memory.

The leakage rate $\tau$ from the circuit breaker is determined by taking the difference between the mean densities obtained at the end of two different nighttime periods. In the example of FIG. 6, an annual leakage rate $\tau$ is calculated in box 64 by taking the difference between the mean densities $\rho_D$ and $\rho_{D+365}$ for two nighttime periods that are spaced apart by one year.

If on two successive occasions during a nighttime period, the variation between the mean densities $\rho_H$ obtained at the ends of two successive hourly intervals exceed a leakage rate threshold S, and providing the threshold is exceeded sooner than a minimum time for calculating the leakage rate $\tau$, then an hourly alarm is generated by an alarm device.

In the example of FIG. 6, an alarm is generated in box 61 and an alarm device A is triggered if a first variation between hourly densities $\rho_{H-1}$ and $\rho_H$ and then a second variation between hourly densities $\rho_H$ and $\rho_{H+1}$ both exceed a threshold leakage rate S. Under such circumstances, the twelve most recent hourly density values corresponding to three days of recording are stored in a memory. Subsequent processing makes it possible to estimate the reliability of the measurements performed during each hour.

If no alarm is generated after three days, then the hourly mean densities are erased and only the daily density is stored in the memory.

We claim:

1. A method of monitoring the leakage rate from the envelope of a high voltage electrical apparatus containing a gas under pressure, the method consisting in:

i) making a series of recordings of the density of the gas at regular time intervals during a nighttime period by means of a temperature-compensated pressure sensor fixed on the outside of the envelope and communicating with the gas via a duct formed through the thickness of the envelope;

ii) processing the density recordings of the gas acquired during the nighttime period in hourly intervals, each hourly interval giving rise to an hourly mean value for the density of the gas;

iii) processing the hourly mean values obtained at the end of each hourly interval to give a daily mean value for the density of the gas at the end of the nighttime period; and iv) determining the leakage rate from the envelope by taking the difference between mean densities obtained at the ends of two different nighttime periods.

2. A method according to claim 1, in which an hourly alarm is generated by an alarm device if on two successive occasions during a nighttime period, the variation between mean hourly densities obtained at the ends of two successive hourly intervals both exceed a leakage rate threshold.

3. A method according to claim 1, in which an annular leakage rate from the envelope is determined by taking the difference between the mean daily densities obtained at the ends of two nighttime periods that are spaced apart by one year.

4. A method according to claim 3, in which the nighttime periods extend from midnight to 4:00 AM.

* * * * *